(12) United States Patent
Mo

(10) Patent No.: US 11,850,976 B2
(45) Date of Patent: Dec. 26, 2023

(54) SEAT ADJUSTMENT STRUCTURE AND CHILD SAFETY SEAT

(71) Applicant: WONDERLAND SWITZERLAND AG, Steinhausen (CH)

(72) Inventor: Xiaolong Mo, Steinhausen (CH)

(73) Assignee: WONDERLAND SWITZERLAND AG, Steinhausen (CH)

( * ) Notice: Subject to any disclaimer, the term of this patent is extended or adjusted under 35 U.S.C. 154(b) by 0 days.

(21) Appl. No.: 17/847,527

(22) Filed: Jun. 23, 2022

(65) Prior Publication Data
US 2022/0410768 A1    Dec. 29, 2022

(30) Foreign Application Priority Data
Jun. 23, 2021   (CN) .......................... 202110695889.X

(51) Int. Cl.
  *B60N 2/28*       (2006.01)
  *B60N 2/14*       (2006.01)
  *B60N 2/10*       (2006.01)

(52) U.S. Cl.
  CPC ............. *B60N 2/28* (2013.01); *B60N 2/10* (2013.01); *B60N 2/143* (2013.01); *B60N 2/146* (2013.01)

(58) Field of Classification Search
  CPC .... B60N 2/2821; B60N 2/2857; B60N 2/143; B60N 2/146; B60N 2/28; B60N 2/10
  USPC ......................................... 297/256.1, 256.14
  See application file for complete search history.

(56) References Cited

U.S. PATENT DOCUMENTS

| 6,715,828 B1 * | 4/2004 | Cheng ................. | B60N 2/2845 |
| | | | 297/256.16 |
| 7,484,801 B2 * | 2/2009 | Kassai ................. | B60N 2/2806 |
| | | | 297/256.16 |
| 8,876,208 B2 * | 11/2014 | Heisey ................. | B60N 2/2827 |
| | | | 297/130 |
| 2018/0264977 A1 | 9/2018 | Anderson et al. | |

FOREIGN PATENT DOCUMENTS

| CN | 203698375 U | 7/2014 |
| CN | 101961987 B | 10/2014 |
| CN | 206561787 U | 10/2017 |

(Continued)

OTHER PUBLICATIONS

Taiwanese 1st Office Action issued in corresponding Taiwanese Patent No. 111123034, dated May 4, 2023, pp. 1-10.

*Primary Examiner* — Milton Nelson, Jr.
(74) *Attorney, Agent, or Firm* — HAUPTMAN HAM, LLP

(57) ABSTRACT

A seat adjustment structure for adjusting a relative position between a seat and a base carrying the seat is provided. The seat adjustment structure is slidable with respect to the base along a longitudinal centerline, and includes: a pair of engaging members, fixed to one of the base or the seat with respect to the longitudinal centerline; a locking assembly, fixed to the other of the base or the seat, the locking assembly lockable to or unlockable from the engaging member; an operating member movable with respect to the seat along a vertical direction; and a cable, connecting the operating member and the locking assembly, and arranged to transmit a vertical movement of the operating member to the locking assembly, thereby causing the locking assembly to be locked or unlocked with respect to the engaging member to lock or unlock the base with respect to the seat.

20 Claims, 7 Drawing Sheets

(56) References Cited

FOREIGN PATENT DOCUMENTS

| | | | |
|---|---|---|---|
| CN | 213413570 U | 6/2021 | |
| DE | 3809968 A1 | 10/1988 | |
| DE | 20215837 U1 | 12/2002 | |
| EP | 853018 A1 * | 7/1998 | ........... B60N 2/2806 |

* cited by examiner

SEAT ADJUSTMENT STRUCTURE AND CHILD SAFETY SEAT

TECHNICAL FIELD

The present application relates to a seat adjustment structure, and a child safety seat comprising the seat adjustment structure.

BACKGROUND

A child safety seat is a common device on which can be seated infants of different ages. The child safety seat is designed for safety of children while travelling, which can restrain children's dangerous behavior in a car during travelling and protect children from harm in case of accidents such as collisions.

The child safety seat is generally provided with a seat tilt angle adjustment structure, which can adjust the seat to an upright or lying state according to the needs of the child. However, a normal seat tilt angle adjustment structure usually has a complicated design, which leads the child safety seat to have problems of difficult assembling and increased cost.

Moreover, in some uses, the child safety seat needs to have adjustment functions in both fore and aft directions. That is, the seat needs to be rotatable about a generally vertical axis, such that the seat may face forward, rearward, or sideways. Under such circumstances, a new demand is raised for the tilt angle adjustment structure of the child safety seat: the tilt angle adjustment structure needs to have a more flexible operation mode, to allow the user to easily adjust the tilt angle of the seat while the seat is facing in any direction.

SUMMARY

According to the application, a seat adjustment structure for adjusting a relative position between a seat and a base carrying the seat is provided. The seat adjustment structure is capable of sliding with respect to the base along a longitudinal centerline, and includes: one pair of engaging members, symmetrically fixed to one of the base and the seat with respect to the longitudinal centerline; a locking assembly, fixed to the other of the base and the seat, the locking assembly is capable of being locked to or unlocked from the engaging member; an operating member, mounted on the seat or the base, and capable of moving with respect to the seat along a vertical direction; and a cable, connecting the operating member and the locking assembly, and being arranged to transmit a vertical movement of the operating member to the locking assembly, thereby causing the locking assembly to be locked or unlocked with respect to the engaging member, such that the base is locked or unlocked with respect to the seat.

According to the application, a child safety seat is provided, including: a seat for a passenger to sit; a base for fixing the child safety seat to a vehicle; and the seat adjustment structure according to the application, disposed between the seat and the base; wherein the seat includes a rotating disk, the rotating disk is arranged on a side of the seat facing the base, and the rotating disk is capable of rotating with respect to the base through a vertical pivoting shaft located on its longitudinal centerline; and the seat adjustment structure is connected to the rotating disk, so as to be arranged above the rotating disk in a manner capable of sliding with respect to the rotating disk along the longitudinal centerline.

BRIEF DESCRIPTION OF THE DRAWINGS

Embodiments of the application will be specifically described below in conjunction with the accompanying drawings, in which.

DETAILED DESCRIPTION

Although the disclosure is illustrated and described herein with reference to specific embodiments, the disclosure should not be limited to the illustrated details. Specifically, various modifications may be made in these details within the scope of equivalents of the claims and without departing from the disclosure.

Directional expressions such as "front," "rear," "up," and "down" involved in this document are only used for the convenience of understanding, and the disclosure is not limited to these directions, but can be adjusted according to the actual situation.

Figure 1A:
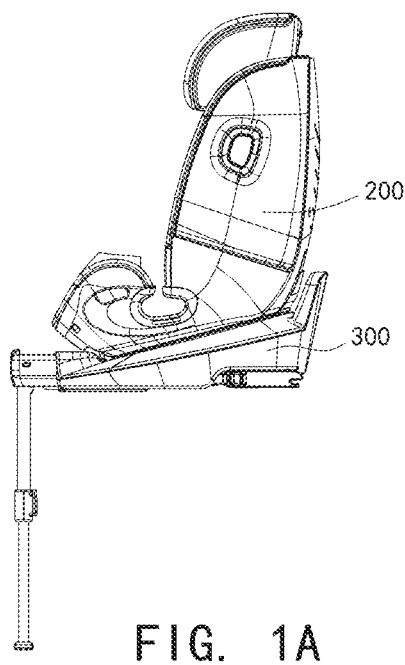
FIG. 1A is a side view of a child safety seat according to the application, in which the seat is in an approximately upright position.
Figure 1B:
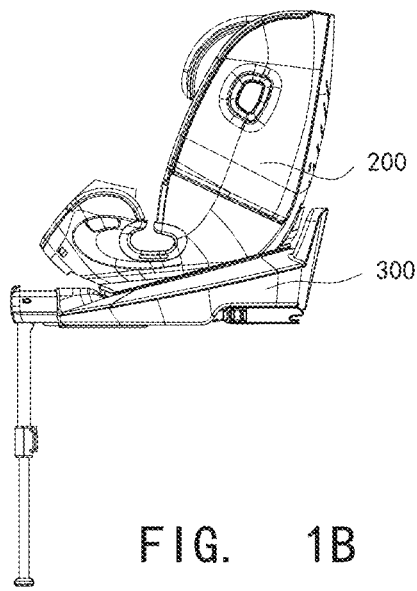
FIG. 1B is another side view of the child safety seat according to the application, in which the seat is in a position tilted to a certain extent.
Figure 2:
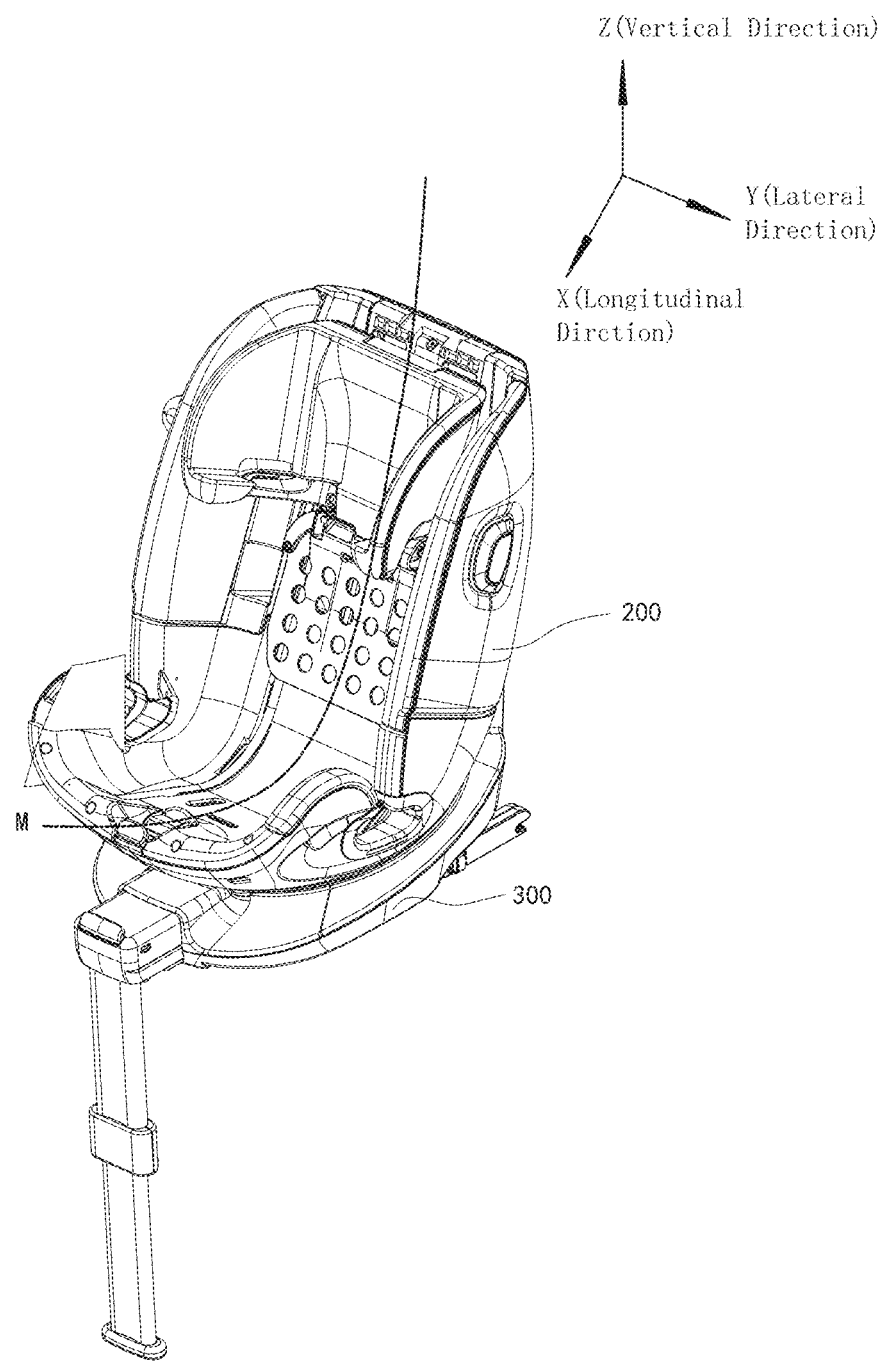
FIG. 2 is a perspective view of the child safety seat according to the application.

A child safety seat according to the application will be generally described by referring to FIGS. 1A-2.

As shown, the child safety seat includes a base 300 and a seat 200. The base 300 is a part that fixes the entire child safety seat to, for example, a rear seat of a car, and the seat 200 is carried on the base 300 and is used for a child to sit. The seat 200 is mounted on the base 300 through a seat adjustment structure 100, and more specifically, on a rotating disk 310 (see FIG. 3A-3B) located at an upper surface of the base 300. An entire mounting sequence of the child safety seat from top to bottom is roughly the seat 200, the seat adjustment structure 100, and the rotating disk 310, and the base 300. In the application, the seat adjustment structure 100 allows the seat 200 to move with respect to the base 300 in a front-rear direction. Since the seat adjustment structure 100 is mounted on the rotating disk 310, the rotating disk 310 allows the seat 200 to rotate with respect to the base 300 around a longitudinal axis. However, it should be understood, the seat adjustment structure 100 of the application is not necessarily to cooperate with the rotating disk 310, but may be connected to the base 300 through other rotating structure(s) or directly fixed to the base 300.

Figure 3A:
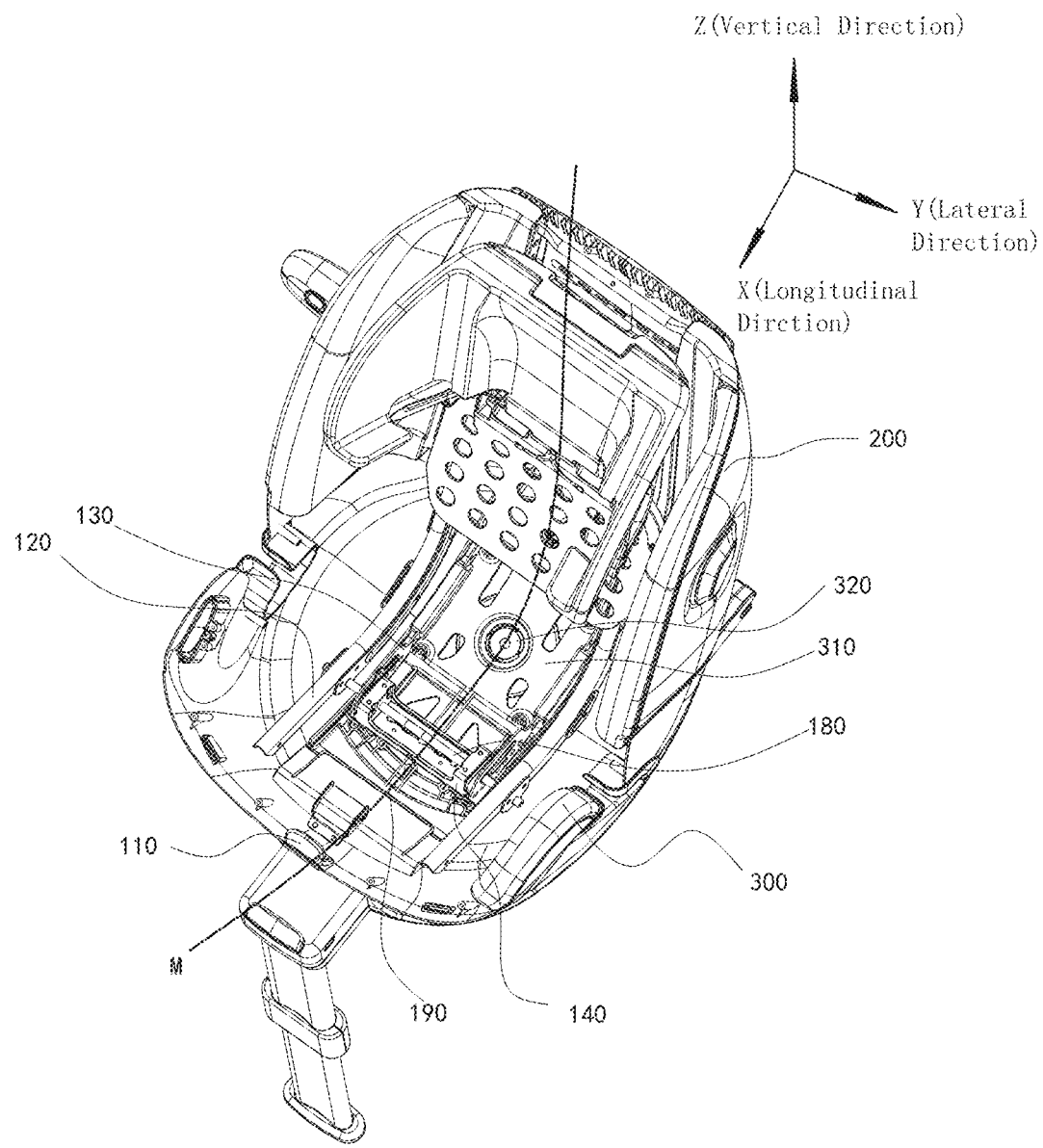
FIG. 3A is a perspective view of the child safety seat according to the application, in which a surface of the seat is removed to show a seat adjustment structure below the surface.
Figure 3B:
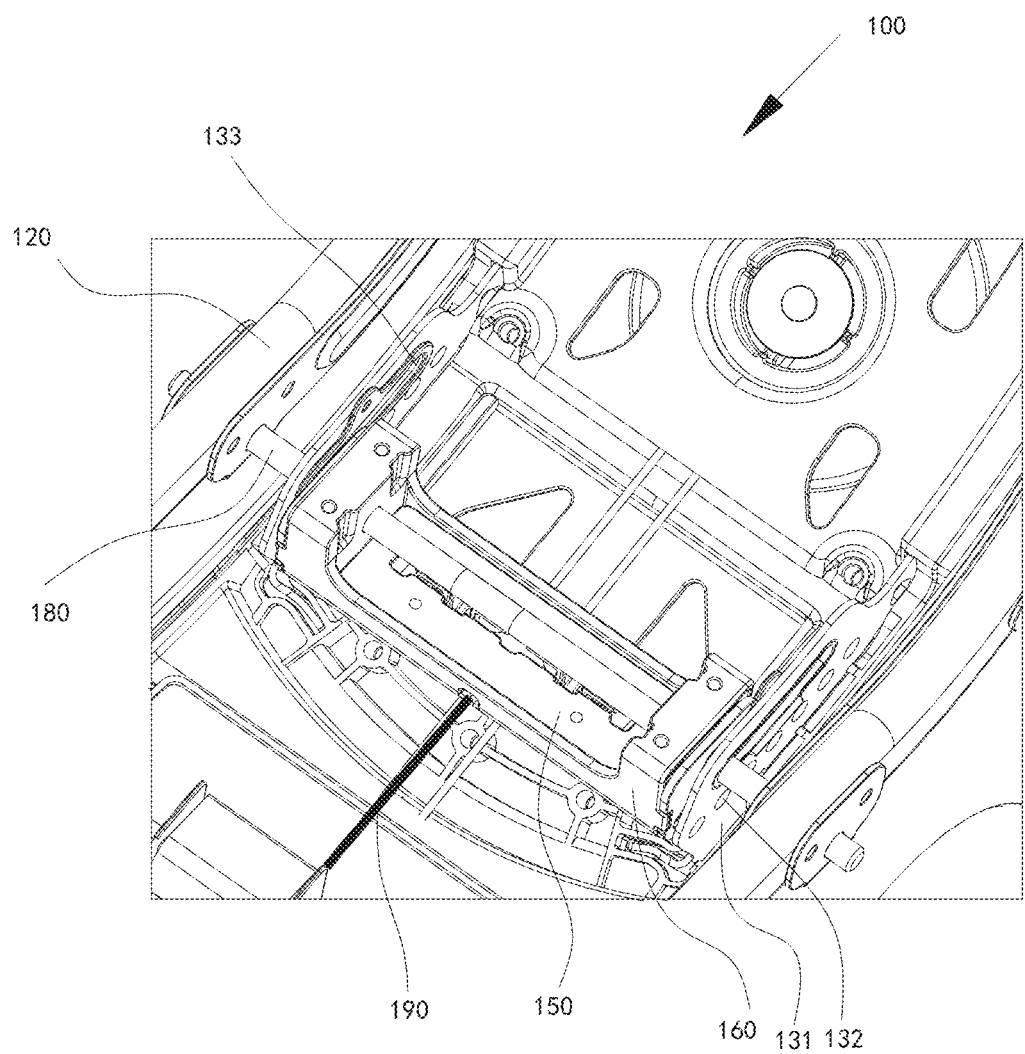
FIG. 3B is a partial enlarged view of FIG. 3A.

Now the seat adjustment structure 100 of the application will be described in more detail by referring to FIG. 3A-3B As shown, the seat adjustment structure 100 includes a plurality of components such as an operating member 110, a seat support 120, engaging members 130, and a locking assembly 140. The operating member 110 is a component located outside the seat 200 for the user to operate. The seat support 120 is a component fixed to the seat 200 for carrying the seat 200. The engaging members 130 each are a component fixed to the base 300. The locking assembly 140 is fixed to the seat support 120, and is used to lock and unlock a positional relationship between the seat support 120 and the engaging members 130. The operating member 110 is connected to the locking assembly 140 through a cable 190, such that the user can operate the locking assembly 140. In other embodiments, the engaging members 130 may be fixed to the seat support 120, and the locking assembly 140 may be fixed to the base 300.

Figure 6A:
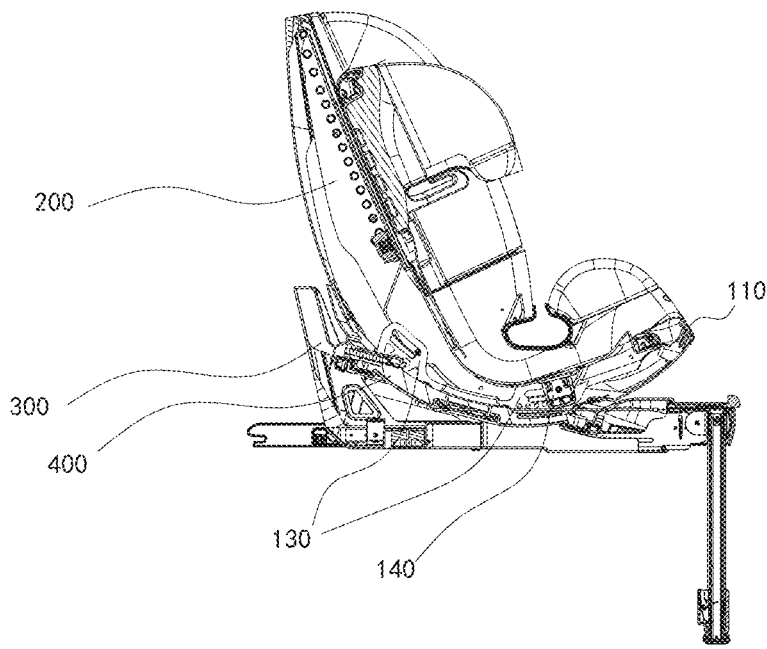
FIG. 6A is a side sectional view of the child safety seat according to the application, in which the seat is in a forward-facing position.
Figure 6B:
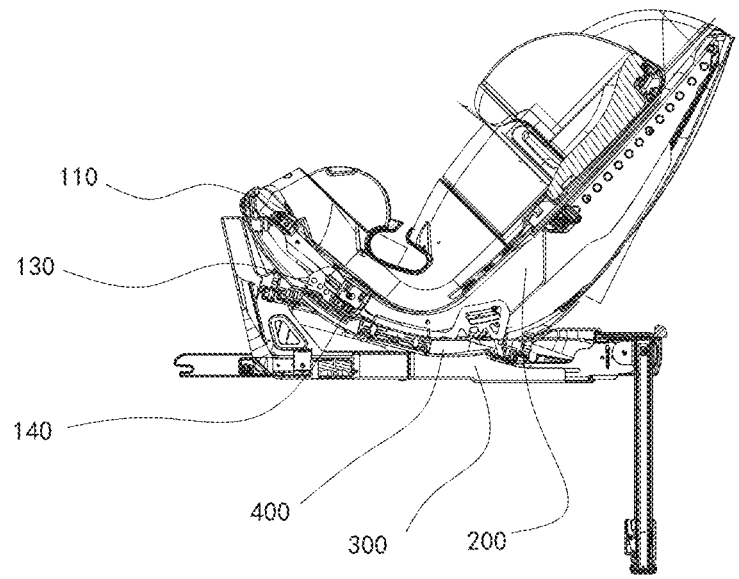
FIG. 6B is another side sectional view of the child safety seat according to the application, in which the seat is in a rearward-facing position.
Figure 7:
FIG. 7 is a perspective view of an operating member according to the application.

The operating member 110 is a handle that is inserted into the seat 200 and can move vertically (see FIGS. 6A-7). The cable 190 is connected between the operating member 110 and the locking assembly 140. A guiding member is disposed below the operating member 110 to guide the cable 190 connecting from below the seat 200 to the locking assembly 140 along an arc, and a structure inside the locking assembly 140 can convert a longitudinal motion of the cable 190 (will be described in detail below) to a lateral movement (Y-axis direction). In this way, a vertical movement of the operating member 110 is finally converted into a lateral movement of a locking pin in the locking assembly 140.

The seat support 120 is a tubular component that extends from a bottom of the seat 200 to a back of the seat 200 along an arc trajectory. In this embodiment, the seat support 120 extends substantially horizontally (i.e., extends longitudinally) at the bottom of the seat 200, and gradually transits to extending substantially vertically at the back of the seat 200. In this embodiment, two seat supports 120 are arranged, and they are arranged in parallel on both left and right sides of the seat 200. It should be understood, shape and number of the seat support 120 can be set according to specific requirements of the seat 200, and are not limited to the shape and number in the embodiments of the application.

Each of the engaging members 130 is a sheet-like component that is fixed to the base 300, and includes two side plates 131 extending substantially along an inner direction of the seat support 120 and having a length smaller than that of the seat support 120. In this embodiment, two pairs of engaging members 130 are arranged, where one pair of engaging members 130 is arranged at positions on the bottom of the seat 200 and thus extends substantially longitudinally; and the other pair of engaging members 130 is arranged at positions on the back of the seat 200 and thus extending substantially vertically. In other embodiments, only one pair of engaging members 130 may be arranged. In this embodiment, the locking assembly 140 is only disposed on the engaging members 130 at positions on the bottom, and in other embodiments, the locking assembly 140 may be disposed on each pair of engaging members 130.

Several engaging holes 132 are formed on one of the side plates 131 of each engaging member 130. The engaging holes 132 are arranged along a moving direction (i.e., the longitudinal direction) of the seat 200, and spacing between the engaging holes 132 is arranged so that the engaging holes 132 are suitable for being simultaneously inserted by two foot portions 171 (see FIG. 4-5) of an engaging pin 170 in the locking assembly 140. Sliding slots 133 are arranged above the engaging holes 132. Extending direction of the sliding slots 133 are as same as arrangement directions of the engaging holes 132, and widths of the sliding slots 133 are suitable for being inserted by a crossbar 180 therein. In other embodiments, the sliding slots 133 may also be arranged below the engaging holes 132.

The locking assembly 140 is a box-shaped component that extends between a pair of engaging members 130. The crossbar 180 laterally passes through and is secured to the locking assembly 140, and extends outward from both lateral sides of the locking assembly 140. Both ends of the crossbar 180 are fixed to the seat support 120 by passing through the sliding slots 133 on the engaging members 130. In this way, relative sliding between the engaging members 130 and the locking assembly 140 is allowed through the crossbar 180 and the sliding slots 133, and sliding trajectories of the engaging members 130 are defined.

The rotating disk 310 is below the engaging members 130. The rotating disk 310 is connected to the base 300 through a vertical pivoting shaft 320, so as to rotate around the vertical direction.

In this way, the rotating disk 310 realizes a rotation function of the seat 200, the seat adjustment structure 100 realizes a movement function of the seat 200 along the extending direction of the seat support 120. In the present embodiment, the extending direction of the seat support 120 is an arc, and in other embodiments, the extending direction of the seat support 120 may also be a straight line or in other forms.

Figure 4:
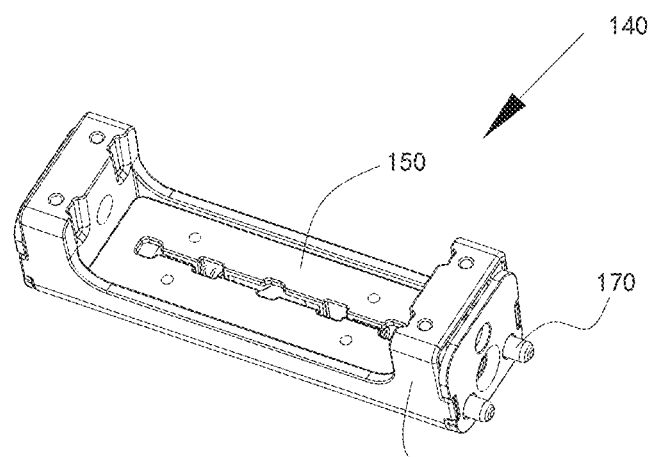
FIG. 4 is a perspective view of a locking assembly of the seat adjustment structure according to the application.
Figure 5:
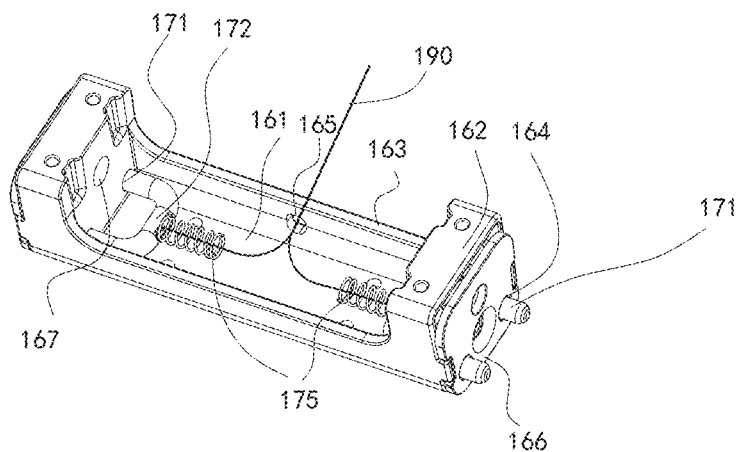
FIG. 5 is a perspective view of the locking assembly of the seat adjustment structure according to the application, in which a positioning cover of the locking assembly is removed to show an engaging pin and a resetting elastic member covered and shielded by the positioning cover.

Specific structure of the locking assembly 140 will be described by referring to FIGS. 4-5.

As shown, the locking assembly 140 includes a fixed seat 160, a positioning cover 150, a pair of engaging pins 170, resetting elastic members 175, and reinforcing members 166.

The fixed seat 160 extends laterally and includes a bottom wall 161, two side walls 163 on both sides of the lateral direction, and two end walls 162 on both ends of the lateral direction, thereby defining an accommodating space. A cable hole 165 for the cable 190 to pass longitudinally into the accommodating space is disposed at a lateral middle of one of the side walls 163 of the fixed seat 160. Each of the end walls 162 is provided with pin holes 164 and crossbar holes 167. Among them, two pin holes 164 are provided, which are located at lower parts of the end walls 162 and distributed in the longitudinal direction; and two crossbar holes 167 are provided, which are located at upper parts of the end walls 162 and corresponding to the middle positions of the two pin holes 164.

The positioning cover 150 is mounted on the fixed seat 160 and covers the accommodating space. The positioning cover 150 is substantially parallel to the bottom wall 161 of the fixed seat 160 and is positioned between the pin holes 164 and the crossbar holes 167 in the vertical direction. A side of the positioning cover 150 facing the bottom wall 161 is provided with cable guiding portions (not shown) for guiding the cable 190 to extend laterally.

Each of the engaging pins 170 is approximately U-shaped and includes a connecting portion 172 and two foot portions 171. The foot portions 171 respectively extend in the lateral direction, are inserted into the pin holes 164 in the lateral end walls 162 of the fixed seat 160, and can protrude from the locking assembly 140 in order to be inserted into the corresponding engaging holes 132. The connecting portion 172 is connected between the two foot portions 171 and located in the accommodating space, so as to locate the engaging pins 170 in the locking assembly 140.

Each of the resetting elastic members 175 has one end abutting on the fixed seat 160 of the locking assembly 140 or the positioning cover 150, and the other end abutting against the connecting portion 172, to apply a thrust to the engaging pins 170 for them to protrude outward from the locking assembly 140. In this way, the engaging pins 170 tend to protrude from the locking assembly 140.

The reinforcing members 166 are attached to outer sides of the end walls 162 of the fixed seat 160, to strengthen the structure of the locking assembly 140.

One end of the cable 190 is connected to the operating member 110, and the other end of the cable 190 is divided into two branch cables 190 after passing through the cable hole 165. Furthermore, the two branch cables 190 extend laterally via respective cable guiding portions and are connected to the corresponding engaging pins 170. The cable guiding portions are disposed on the side of the positioning cover 150 facing the bottom wall 161. In an embodiment, the cable guiding portions are implemented as cable grooves, and the cable grooves are approximately quarter-circular arc grooves extending curved from the cable hole 165 towards the engaging pins 170 for accommodating the branch cables 190 and defining movement trajectories of the branch cables 190. In another embodiment, the cable guiding portions are implemented as pulleys rotatable around a vertical axis for carrying the branch cables 190 to turn the branch cables 190 from the longitudinal direction to the lateral direction.

In this way, through transmission of the cable 190, when the user pulls the operating member 110 upwards, the engaging pins 170 will retract into the locking assembly 140, thereby unlocking the positional relationship between the locking assembly 140 and the engaging members 130, to allow a longitudinal relative movement between the seat 200 and the base 300. When the user releases the operating member 110, the engaging pins 170 will protrude from the locking assembly 140 to be inserted into the engaging members 130, thereby locking the longitudinal relative movement between the seat 200 and the base 300.

Referring to FIGS. 6A-6B, advantages of the seat adjustment structure of the application will be described.

In FIG. 6A, the seat 200 is at a position facing the front of the base 300 (right in the figure), and in FIG. 6B, the seat 200 is at a position facing the rear of the base 300 (left in the figure). It can be seen, no matter which direction the seat 200 is rotated to face, the user can easily pull the operating member 110 to unlock the longitudinal relative movement between the seat 200 and the base 300. However, in some designs of the prior art, since the operating member connected to the locking assembly is designed to be in the same direction as the moving direction of the seat, i.e., the user has to pull or push the operating member along the longitudinal direction, accordingly, when the seat is facings rearward, the user's pulling or pushing of the operating member may interfere with the backrest of the rear seat of the car, so it may be difficult for the user to use the operating member.

The positional relationship between the locking assembly 140 and the engaging members 130 can also be seen from FIGS. 6A-6B. Since each engaging member 130 is provided with a plurality of engaging holes 132, the locking assembly 140 can lock the seat 200 at different positions in the longitudinal direction.

According to the application, a seat adjustment structure for adjusting a relative position between a seat and a base carrying the seat is provided. The seat adjustment structure is capable of sliding with respect to the base along a longitudinal centerline, and includes: one pair of engaging members, symmetrically fixed to one of the base and the seat with respect to the longitudinal centerline; a locking assembly, fixed to the other of the base and the seat, the locking assembly is capable of being locked to or unlocked from the engaging member; an operating member, mounted on the seat or the base, and capable of moving with respect to the seat along a vertical direction; and a cable, connecting the operating member and the locking assembly, and being arranged to transmit a vertical movement of the operating member to the locking assembly, thereby causing the locking assembly to be locked or unlocked with respect to the engaging member, such that the base is locked or unlocked in respect to the seat.

In an embodiment, several engaging holes are formed on each of the engaging members; the locking assembly is provided with a pair of engaging pins, the engaging pins are capable of being extended and retracted along a lateral direction perpendicular to the longitudinal centerline, thereby being extended and inserted into the corresponding engaging holes to lock the locking assembly to the engaging members, or retracted from the corresponding engaging holes to unlock the locking assembly from the engaging members; and the cable connects the operating member and the engaging pins, and is arranged to be capable of transmitting the vertical movement of the operating member to the engaging pins, such that the engaging pins are capable of being extended and retracted.

In an embodiment, the seat adjustment structure further comprises a crossbar which is arranged corresponding to the engaging members, the crossbar extends along the lateral direction and is fixed to one of the base and the seat; the engaging members are respectively provided with sliding slots defining a sliding trajectory, and the crossbar passes through the sliding slots, such that when the seat slides with respect to the base, the crossbar slides with respect to the sliding slots along the sliding trajectory.

In an embodiment, the engaging members include a pair of parallel side plates, and the several engaging holes are arranged on one side of the sliding slots at regular intervals along the sliding trajectory.

In an embodiment, the locking assembly is located between the engaging members, and includes: a fixed seat extending along the lateral direction to define an accommodating space with the crossbar passing through the fixed seat; and a positioning cover mounted on the fixed seat to cover the accommodating space; wherein the two engaging pins are respectively arranged in the accommodating space, and arranged at two lateral end walls of the fixed seat, and capable of extending out of the fixed seat to be inserted into the engaging holes or separating from the engaging holes to be retracted into the fixed seat.

In an embodiment, the fixed seat of the locking assembly is provided with a cable hole for the cable to pass longitudinally into the accommodating space, and the cable hole is disposed at a central position of a side wall of the fixed seat facing the operating member; a side of the positioning cover facing a bottom wall of the fixed seat is provided with cable guiding portions for guiding the cable to extend laterally; and one end of the cable is connected to the operating member, and the other end of the cable is divided into two branch cables after passing through the cable hole, the two branch cables extend laterally via their respective cable guiding portions and are connected to the corresponding engaging pins.

In an embodiment, the engaging pins are approximately U-shaped and include: two foot portions, respectively extending along the lateral direction and inserted into the lateral end walls of the fixed seat, and being capable of protruding from the locking assembly in order to be inserted into the corresponding engaging holes; and a connecting portion, connected between the two foot portions and located in the accommodating space.

In an embodiment, the locking assembly further includes resetting elastic members, each of the resetting elastic members has one end fixed on the fixed seat or the positioning cover of the locking assembly, and the other end abutting against the connecting portion, so as to apply a thrust to the engaging pins for them to protrude outward from the locking assembly.

In an embodiment, reinforcing members are respectively fixed on outer sides of the two lateral end walls of the fixed seat.

In an embodiment, the cable guiding portions are cable grooves, and the cable grooves are approximately quarter-circular arc grooves extending curved from the cable hole towards the engaging pins for accommodating the branch cables and defining movement trajectories of the branch cables; or the cable guiding portions are pulleys rotatable around a vertical axis for carrying the branch cables to turn the branch cables from the longitudinal direction to the lateral direction.

In an embodiment, the engaging members are fixed on the base; and the locking assembly is fixed on the seat via the crossbar.

According to the application, a child safety seat is provided, including: a seat for a passenger to sit; a base for fixing the child safety seat to a vehicle; and the seat adjustment structure according to the application, disposed between the seat and the base; wherein the seat includes a rotating disk, the rotating disk is arranged on a side of the seat facing the base, and the rotating disk is capable of rotating with respect to the base through a vertical pivoting shaft located on its longitudinal centerline; and the seat adjustment structure is connected to the rotating disk, so as to be arranged above the rotating disk in a manner capable of sliding with respect to the rotating disk along the longitudinal centerline.

In an embodiment, the rotating disk has an arc surface along an arc between a bottom and a backrest of the seat, the arc surface includes an approximately horizontal portion and an approximately vertical portion.

The seat adjustment structure further includes another pair of engaging members and another crossbar, the pair of engaging members and the crossbar are located at a horizontal portion of the rotating disk, and another pair of engaging members and another crossbar are located at a vertical portion of the rotating disk.

Although the disclosure has been provided by with reference to typical embodiments, the terms used are illustrative and exemplary rather than restrictive. Since the disclosure can be implemented in various forms without departing from the spirit and essence of the disclosure, it should be understood, the above-mentioned embodiments are not limited to any of the foregoing details, but shall be interpreted in the broadest sense within the scope defined by the claims. Therefore, any variation falling within the scope of the claims or their equivalents shall be covered by the claims.

LIST OF REFERENCE SIGNS

100 Seat Adjustment Structure
  110 Operating member
  120 Seat Support
  130 Engaging Member
    131 Side Plate
    132 Engaging Hole
    133 Sliding Slot
  140 Locking Assembly
  150 Positioning Cover
  160 Fixed seat
    161 Bottom Wall
    162 End Wall
    163 Side Wall
    164 Pin hole
    165 Cable hole
    166 Reinforcing Member
    167 Crossbar Hole
  170 Engaging Pin
    171 Foot Portion
    172 Connecting Portion
  175 Resetting Elastic Member
  180 Crossbar
  190 Cable
200 Seat
300 Base
  310 Rotating Disk
  320 Vertical Pivoting Shaft
M Longitudinal Centerline
X Longitudinal Direction (Front-Rear Direction)
Y Lateral Direction (Left-Right Direction)
Z Vertical Direction (Up-Down Direction)

What is claimed is:

1. A seat adjustment structure for adjusting a relative position between a seat and a base carrying the seat, wherein the seat adjustment structure is configured to slide with respect to the base along a longitudinal centerline of the seat, and the seat adjustment structure comprises:
   one pair of engaging members, configured to be fixed to one of the base and the seat with respect to the longitudinal centerline;
   a locking assembly, configured to be fixed to the other of the base and the seat and configured to be locked to or unlocked from the pair of engaging members;
   an operating member, configured to be mounted on the seat or the base and configured to move with respect to the seat along a vertical direction; and
   a cable, connecting the operating member and the locking assembly, and being arranged to transmit a vertical movement of the operating member to the locking assembly, thereby causing the locking assembly to be locked or unlocked with respect to the engaging members, such that the base is locked or unlocked with respect to the seat,
   wherein the cable extends along a longitudinal direction of the seat between the operating member and the locking assembly.

2. The seat adjustment structure according to claim 1, wherein:
   several engaging holes are formed on each of the engaging members;
   the locking assembly is provided with a pair of engaging pins, the engaging pins are capable of being extended and retracted along a lateral direction perpendicular to the longitudinal centerline, thereby being extended and inserted into the corresponding engaging holes to lock the locking assembly to the engaging members, or retracted from the corresponding engaging holes to unlock the locking assembly from the engaging members; and the cable connects the operating member and the engaging pins, and is arranged to be capable of transmitting the vertical movement of the operating member to the engaging pins, such that the engaging pins are capable of being extended and retracted along the lateral direction.

3. The seat adjustment structure according to claim 2, further comprising:

a crossbar arranged corresponding to the engaging members, the crossbar extending along the lateral direction and being configured to be fixed to one of the base and the seat, wherein the engaging members are respectively provided with sliding slots, and the crossbar passes through the sliding slots, such that in response to the seat sliding with respect to the base, the crossbar is configured to slide with respect to the sliding slots along a sliding trajectory.

4. The seat adjustment structure according to claim 3, wherein:

the engaging members are configured to be fixed on the base; and the locking assembly is configured to be fixed on the seat via the crossbar.

5. The seat adjustment structure according to claim 3, wherein:

the engaging members comprise a pair of parallel side plates, and the several engaging holes are arranged on one side of the sliding slots at regular intervals along the sliding trajectory.

6. The seat adjustment structure according to claim 5, wherein:

the locking assembly is located between the engaging members, and comprises:
  a fixed seat extending along the lateral direction to define an accommodating space with the crossbar passing through the fixed seat; and
  a positioning cover mounted on the fixed seat to cover the accommodating space; and
wherein, the two engaging pins are respectively arranged in the accommodating space, and arranged at two lateral end walls of the fixed seat, and capable of extending out of the fixed seat to be inserted into the engaging holes or separating from the engaging holes to be retracted into the fixed seat.

7. The seat adjustment structure according to claim 6, wherein:

the fixed seat of the locking assembly is provided with a cable hole for the cable to pass longitudinally into the accommodating space, and the cable hole is disposed at a central position of a side wall of the fixed seat facing the operating member;

a side of the positioning cover facing a bottom wall of the fixed seat is provided with cable guiding portions for guiding the cable to extend laterally; and one end of the cable is connected to the operating member, and the other end of the cable is divided into two branch cables after passing through the cable hole, the two branch cables extend laterally via their respective cable guiding portions and are connected to the corresponding engaging pins.

8. The seat adjustment structure according to claim 7, wherein:

the cable guiding portions are cable grooves, and the cable grooves are approximately quarter-circular arc grooves extending curved from the cable hole towards the engaging pins for accommodating the branch cables and defining movement trajectories of the branch cables; or the cable guiding portions are pulleys rotatable around a vertical axis for carrying the branch cables to turn the branch cables from the longitudinal direction to the lateral direction.

9. The seat adjustment structure according to claim 7, wherein:

the engaging pins are approximately U-shaped and comprise:
  two foot portions, respectively extending along the lateral direction and inserted into the lateral end walls of the fixed seat, and being capable of protruding from the locking assembly in order to be inserted into the corresponding engaging holes; and
  a connecting portion, connected between the two foot portions and located in the accommodating space.

10. The seat adjustment structure according to claim 9, wherein:

the locking assembly further comprises resetting elastic members, each of the resetting elastic members has one end fixed on the fixed seat or the positioning cover of the locking assembly, and the other end abutting against the connecting portion, so as to apply a thrust to cause the engaging pins to be protruded outward from the locking assembly.

11. The seat adjustment structure according to claim 10, wherein:

reinforcing members are respectively fixed on outer sides of the two lateral end walls of the fixed seat.

12. A child safety seat comprising:
a seat;
a base for fixing the child safety seat to a vehicle; and
a seat adjustment structure that adjusts a relative position between the seat and the base, disposed between the seat and the base, the seat adjustment structure is capable of sliding with respect to the base along a longitudinal centerline of the seat;
wherein
the seat adjustment structure comprises
  one pair of engaging members, fixed to one of the base and the seat with respect to the longitudinal centerline;
  a locking assembly, fixed to the other of the base and the seat, capable of being locked to or unlocked from the pair of engaging members;
  an operating member, mounted on the seat or the base, capable of moving with respect to the seat along a vertical direction; and
  a cable, connecting the operating member and the locking assembly, and being arranged to transmit a vertical movement of the operating member to the locking assembly, thereby causing the locking assembly to be locked or unlocked with respect to the engaging members, such that the base is locked or unlocked with respect to the seat,
the seat comprises a rotating disk, the rotating disk is arranged on a side of the seat facing the base, and the rotating disk is capable of rotating with respect to the base through a vertical pivoting shaft located on its longitudinal centerline; and
the seat adjustment structure is connected to the rotating disk, so as to be arranged above the rotating disk in a manner capable of sliding with respect to the rotating disk along the longitudinal centerline of the seat.

13. The child safety seat according to claim 12, wherein:
the rotating disk has an arc surface along an arc between a bottom and a backrest of the seat, the arc surface comprises an approximately horizontal portion and an approximately vertical portion; and
the seat adjustment structure further comprises another pair of engaging members and another crossbar, the pair of engaging members and a crossbar arranged corresponding to the engaging members are located at a horizontal portion of the rotating disk, and the other pair of engaging members and the other crossbar are located at a vertical portion of the rotating disk.

14. A seat adjustment structure that adjusts a relative position between a seat and a base carrying the seat, wherein the seat adjustment structure is slidable with respect to the base along a longitudinal centerline of the seat and the seat adjustment structure comprises:
an operating member, mounted on the seat or the base, movable with respect to the seat along a vertical direction;
a pair of engaging members, fixed to the base or the seat with respect to the longitudinal centerline;
a locking assembly, fixed to the other of the base or the seat, capable of being locked to or unlocked from at least one of the pair of engaging members; and
a cable, connecting the operating member and the locking assembly, and being arranged to transmit a vertical movement of the operating member to the locking assembly, thereby causing the locking assembly to be locked or unlocked with respect to the pair of engaging members to lock or unlock the base with respect to the seat,
wherein the cable extends along a longitudinal direction of the seat between the operating member and the locking assembly.

15. The seat adjustment structure according to claim 14, wherein:
each of the engaging members has at least one engaging hole formed therein;
the locking assembly has a pair of engaging pins, the engaging pins are capable of being extended and retracted along a lateral direction perpendicular to the longitudinal centerline, thereby being extended and inserted into a corresponding engaging hole to lock the locking assembly to the engaging members, or retracted from the corresponding engaging hole to unlock the locking assembly from the engaging members; and
the cable connects the operating member and the engaging pins, and is arranged to be capable of transmitting the vertical movement of the operating member to the engaging pins, such that the engaging pins are capable of being extended and retracted along the lateral direction.

16. The seat adjustment structure according to claim 15, further comprising:
a crossbar arranged corresponding to the engaging members, the crossbar extending along the lateral direction and being fixed to one of the base or the seat,
wherein the engaging members include corresponding sliding slots, and the crossbar passes through the sliding slots, such that in response to the seat sliding with respect to the base, the crossbar is configured to slide with respect to the sliding slots along a sliding trajectory.

17. The seat adjustment structure according to claim 16, wherein:
the engaging members comprise a pair of parallel side plates, and the at least one engaging hole is arranged on one side of the sliding slots at regular intervals along the sliding trajectory.

18. The seat adjustment structure according to claim 17, wherein:
the locking assembly is located between the engaging members, and comprises:
a fixed seat extending along the lateral direction to define an accommodating space with the crossbar passing through the fixed seat; and
a positioning cover mounted on the fixed seat to cover the accommodating space; and
wherein, the two engaging pins are correspondingly arranged in the accommodating space, and arranged at two lateral end walls of the fixed seat, and capable of extending out of the fixed seat to be inserted into the engaging holes or separating from the engaging holes to be retracted into the fixed seat.

19. The seat adjustment structure according to claim 18, wherein:
the fixed seat of the locking assembly has formed therein a cable hole for the cable to pass longitudinally into the accommodating space, and the cable hole is at a central position of a side wall of the fixed seat facing the operating member;
a side of the positioning cover facing a bottom wall of the fixed seat has cable guiding portions for guiding the cable to extend laterally; and
one end of the cable is connected to the operating member, and the other end of the cable is divided into two branch cables after passing through the cable hole, the two branch cables extend laterally via their corresponding cable guiding portions and are connected to the corresponding engaging pins.

20. The seat adjustment structure according to claim 19, wherein:
the engaging pins are approximately U-shaped and comprise:
two foot portions, correspondingly extending along the lateral direction and inserted into the lateral end walls of the fixed seat, and are capable of protruding from the locking assembly in order to be inserted into the corresponding engaging holes; and
a connecting portion, connected between the two foot portions and located in the accommodating space.

* * * * *